(12) United States Patent
Klaren

(10) Patent No.: US 7,141,219 B1
(45) Date of Patent: Nov. 28, 2006

(54) APPARATUS FOR CARRYING OUT A PHYSICAL AND/OR CHEMICAL PROCESS, SUCH AS HEAT EXCHANGER

(75) Inventor: Dick Gerrit Klaren, Hillegom (NL)

(73) Assignee: Klarex Beheer B.V., Nijkerk (NL)

( * ) Notice: Subject to any disclaimer, the term of this patent is extended or adjusted under 35 U.S.C. 154(b) by 96 days.

(21) Appl. No.: 10/381,329

(22) PCT Filed: Sep. 22, 2000

(86) PCT No.: PCT/NL00/00678

§ 371 (c)(1),
(2), (4) Date: Jul. 31, 2003

(87) PCT Pub. No.: WO02/25200

PCT Pub. Date: Mar. 28, 2002

(51) Int. Cl.
*B01J 8/18* (2006.01)

(52) U.S. Cl. .................... 422/147; 422/139; 422/141; 422/142; 422/145

(58) Field of Classification Search ................ 422/139, 422/140, 141, 143, 145, 146, 147, 198, 200, 422/201

See application file for complete search history.

(56) References Cited

U.S. PATENT DOCUMENTS 3,941,315 A * 3/1976 Gribble et al. ................. 241/3

FOREIGN PATENT DOCUMENTS

| EP | 0 065 332 | 11/1982 |
| EP | 0 451 518 A | 10/1991 |
| GB | 2 087 534 A | 5/1982 |
| WO | WO 94/24507 | 10/1994 |
| WO | WO 94/24508 | 10/1994 |

* cited by examiner

*Primary Examiner*—Alexa D. Neckel
(74) *Attorney, Agent, or Firm*—Merchant & Gould P.C.

(57) ABSTRACT

An apparatus for carrying out a physical and/or chemical process, such as a heat exchanger, comprising a fluidized bed, through which a fluid flows, and a separator for separating fluidized bed particles from the medium for recirculation. According to the invention, the top box is provided with separated discharge means for discharging a main flow of medium with a partial flow of medium and for discharging granular material.

11 Claims, 3 Drawing Sheets

APPARATUS FOR CARRYING OUT A PHYSICAL AND/OR CHEMICAL PROCESS, SUCH AS HEAT EXCHANGER

CROSS-REFERENCE TO RELATED APPLICATIONS

This application is a 371 of PCT/NL00/00678, filed Sep. 22, 2000.

FIELD OF THE INVENTION

This invention relates to an apparatus for carrying out a physical and/or chemical process, such as a heat exchanger, comprising a reservoir provided with upwardly directed tubes, which tubes are accommodated, at top and bottom ends thereof, in tube plates and are in open communication with a top box and a bottom box, in which bottom box at least one distribution plate is arranged for supporting a fluidized bed of granular material, which is maintainable in a quasi-stationary, fluidized condition by a medium to be treated or heated, fed via the bottom box and flowing through the tubes, which apparatus further comprises a downcomer, placed outside the reservoir, for feeding granular material separated from the medium back to the bottom box.

BACKGROUND OF THE INVENTION

Such apparatus is known from GB 2 087 538 and comprises a lock system in the external downcomer forfeeding particles batchwise from the top box back to the bottom box.

EP 0 065 332 and EP 0 451 518 disclose a fluidized bed type heat exchanger in which the fluidized bed is maintained in quasi-stationary, fluidized condition by recirculation of both granular material and medium through an internal downcomer from the top box back to the bottom box.

A further apparatus is known from the international patent application PCT/NL94/00081. In this apparatus, the external downcomer placed outside the reservoir is connected at a top end with the top box via a separator, designed as a cyclone, for separating granular material from the medium. At a bottom end, the downcomer is communicable, through switching on and off, with the bottom box of the reservoir.

A variant of the above apparatus, which is particularly suitable for processing a medium of high viscosity and/or a large volume flow of medium, is described in PCT/NL94/00082. In this apparatus, the bottom box is provided with a divided feed of medium, so that a part of the medium is fed above the fluidized bed, as a result of which the fluidized bed can be stable and sufficiently dense. In this variant, the tubes are provided with run-in pieces, extending into the bottom box, with inflow openings arranged in the tube walls for increasing the inflow of medium.

In the apparatuses known from PCT/NL94/00081 and PCT/NL94/00082, the total amount of flowing medium with fluidized bed particles included therein therefore flows from the vertical tubes of the reservoir via the top box to the separator designed as a cyclone, in which the granular material, hereinafter also called fluidized bed particles, is separated from the medium.

A drawback of this arrangement is that the cyclone, in particular with large throughputs of flowing medium, can assume a considerable dimension and that the walls of the separator and the communication line between the separator and the top box must be protected against wear through the fluidized bed particles present in the flowing medium. The making of arrangements against wear for such a relatively large cyclone separator can be very expensive, in particular when the flowing medium is also corrosive.

Furthermore, since the separator must be located at about the same height as the top box, the large cyclone separator must be supported separately. Since the reservoir with the top box often reaches a considerable height, the support is often relatively complicated and expensive.

Another drawback of a cyclone as separator is the pressure drop required for effecting separation of the fluidized bed particles and flowing medium in the cyclone. When the material of these particles has a low density, e.g. 2400 $kg/cm^3$, and the dimensions of these particles are relatively small, e.g. 1 to 2 mm, this pressure drop can impede the downward transport of the fluidized bed particles in the external downcomer and even cause it to reverse to an undesirable upward transport, as a result of which the fluidized bed particles are no longer fed to the bottom box, but discharged with the flowing medium via the separator.

BRIEF SUMMARY OF THE INVENTION

The object of the invention is to provide an apparatus of the type mentioned in the opening paragraph, in which the above drawbacks are removed. According to the invention, the apparatus is therefore characterized in that the downcomer is provided near its top end with a discharge line for feeding the partial flow of medium from which the granular material has been separated under the action of gravity, to the main flow of medium.

In the top box, the upward flow velocity of the medium is lower than in the tubes. As a result thereof, depending on the selected upward flow velocity and the viscosity of the medium, the form and weight of the granular material, the granular material entrained via the tubes with the medium from the fluidized bed can be separated from the medium in a lower part of the top box under the action of gravity, while the medium from which the granular material has been separated flows upward further to an upper part of the top box. The upward flow velocity of the medium is therefore selected to be lower than the downward fall velocity of the granular material in the medium.

By means of the first discharge, the granular material separated in the top box can be discharged with a partial flow of the medium to the downcomer, while with a second discharge located downstream above a main flow of medium can be discharged free from particles.

The partial flow of medium ensures that the discharge of the granular material through the first discharge line can proceed reliably and with sufficient throughput. To stimulate flow of the partial flow of medium with the granular material through the first discharge line, the apparatus can be provided with means for generating a pressure difference over the first discharge line, such that the pressure near the entrance of the first discharge line is higher than near the exit of the first discharge line.

Such means for generating a pressure difference may comprise a flow resistance provided in the top box, e.g. a distribution plate in the top box, a fluidized bed extending with a height h above the entrance opening of the first discharge, an entrance loss and/or a line resistance in the second discharge line.

Furthermore, at the location of the outflow opening of the first discharge line, the downcomer may be connected with an area with a pressure lower with respect to the entrance opening of the first discharge line, e.g. a part of the second discharge line located downstream.

In an elegant manner, the top box may be divided by means of a distribution plate into a lower part to which the first discharge line is connected and a second part where, as a result of the distribution plate, a lower pressure prevails, and to which the second discharge line is connected, while an upper part of the downcomer is connected with the upper part of the top box.

From the top box, the separated granular material is fed to the downcomer where it falls down under the action of gravity.

The granular material is fed to the external downcomer with a small and adjustable partial flow of flowing medium. Within the downcomer, a separation of flowing medium and granular material is then effected again under the action of gravity. The partial flow of flowing medium, from which the granular material has been separated, can be discharged by generating only a small pressure difference via the top end of the external downcomer. In an advantageous embodiment, the external downcomer can therefore be provided near its top end with a discharge line which, viewed in the direction of flow of the medium in the top box, is connected with the top box between the first and the second discharge line. Of course, a line for feeding the partial flow of medium from which the granular material has been separated to the main flow can also be provided in another manner.

The separator, designed as a cyclone, arranged externally with respect to the top box, can be avoided according to the invention, with the result that the use of this relatively large additional apparatus and the additional provisions required therefore against wear is no longer necessary. Moreover, no separate supporting structure is required. Because the flow velocity reducing means are integrated into the top box, the supporting structure already present for the top box and the reservoir suffices. Furthermore, only a small pressure drop is necessary between the top box and the external downcomer, so that the risk of undesirable upward transport of granular material in the downcomer is substantially lower.

By using the means, integrated with the top box, for reducing the flow velocity, it is ensured that even at greater throughputs and/or high viscosities, during use, the upward flow velocity of the medium in the top box can be lower than the fall velocity of the granular material in the flowing medium, as a result of which the granular material can be separated.

The flow velocity reducing means preferably comprise an expansion space integrated with the top box, e.g. a part of the top box having an enlarged diameter with respect to the reservoir. This ensures that the dimensions of the top box with expansion space in upward direction can be relatively small.

In addition to or side by side with that, the flow velocity reducing means may comprise a flow resistance integrated with the top box, e.g. a distribution plate extending between the first and the second discharge opening in the top box and provided with flow passage openings. The flow resistance may already be formed by a second fluidized bed of granular material. Such a bed can be formed, during use, in e.g. the top box above a supporting plate provided in the top box, e.g. designed as a throttling plate placed above the openings of the tubes. Preferably, the first discharge opening, during use, connects to the fluidized bed, while the second discharge opening is located in upward direction at a distance above the fluidized bed.

The invention also relates to a method for carrying out a chemical and/or physical process.

The manner of feeding flowing medium to the bottom box of the apparatus and feeding particles of granular material back to the bottom box via the downcomer is already known to those skilled in the art and can be carried out in many ways, e.g. as described in the international patent applications PCT/NL94/00081 and PCT/NL94/00082.

BRIEF DESCRIPTION OF THE SEVERAL VIEWS OF THE DRAWINGS

The invention will now be explained in more detail with reference to an exemplary embodiment shown in a drawing. In the drawing.

The figures only relate to diagrammatic representations of preferred embodiments of the invention. In the figures, similar or corresponding parts are indicated by the same reference numerals.

DETAILED DESCRIPTION OF THE INVENTION

Figure 1:
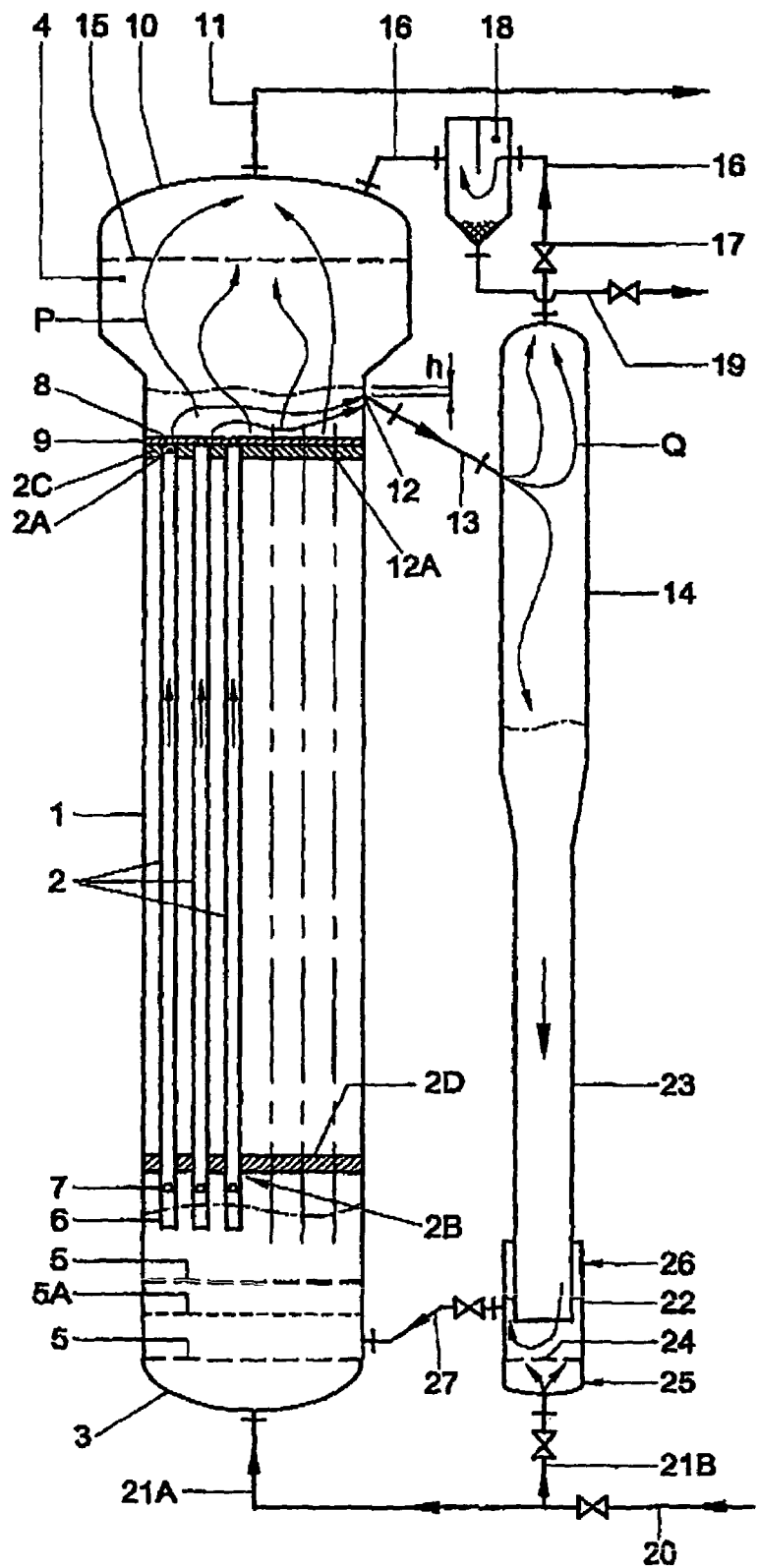
FIG. 1 is a diagrammatic cross-section of a heat exchanger according to the invention.

FIG. 1 shows a heat exchanger comprising a reservoir 1, in which a series of risers 2 are provided, which are accommodated at the top end 2A and the bottom end 2B in tube plates 2C, 2D. Above the upper tube plate 2C a top box 4 separated from the reservoir 1 is located, into which the risers 2 open, while below the lower tube plate 2D a bottom box 3 separated from the reservoir is present, in which one or more distribution plates 5 are provided to support a fluidized bed of granular material. The risers 2 are provided at the bottom ends 2B with run-in pieces 6, in which openings 7 are provided. Arranged above or at a short distance from the upper tube plate 2C is a throttling plate 9 with openings 8, which are in register with the openings of the risers 2 and have a diameter smaller than the internal diameter of the risers 2. In the top box 4 are provided an opening 12, to which connects a first discharge line 13 for discharging, with a partial flow of medium from the top box 4, fluidized bed particles separated in the top box, and an opening 10. In the top box 4 is further provided a second discharge line 11, located upstream in the upward direction of flow of the medium indicated by the arrow P, for discharging a main flow of medium without granular material. The first discharge opening 12 is connected with the top end of the external downcomer 14. The medium to be treated or heated is fed to the heat exchanger via the line 20, which divides into a line 21A to the bottom box 3 and a line 21B to the collecting reservoir 22 located at the bottom end of the external downcomer 23. By means of a distribution plate 24 for supporting the fluidized bed particles fed through the external downcomer, the collecting reservoir 22 is divided into a bottom section 25 and a top section 26. The top section 26 is connected via one or more lines 27 to the bottom box 3 for feeding the fluidized bed particles back thereto from the collecting reservoir 22. The lines 20, 21B and 27 may be provided with regulating or shut-off valves.

In the outlet box 4 a division of the discharge of flowing medium takes place. The largest amount of flowing medium, the main flow, flows through the outlet box 4 substantially in an upward direction, and is discharged via opening 10 and the second discharge line 11. A much smaller amount of flowing medium, the partial flow, with the total amount of circulating fluidized bed particles therein, is discharged from the outlet box 4 substantially sideward via opening 12 and the first discharge line 13 to the top end of the external downcomer 14. To prevent a relatively large main flow of flowing medium from entraining fluidized bed particles from the outlet box 4, the outlet box is, in this example, provided with flow velocity reducing means for reducing the upward flow velocity of the medium, designed as an integrated expansion space. At the location of the expansion space the top box 4 has a greater diameter than the reservoir 1. The top box 4 with the expansion space is dimensioned such that, during use, the velocities of the flowing medium remain so low that discharge of fluidized bed particles via the second discharge line is not possible.

The size of partial flow of flowing medium may be adjusted by providing a flow resistance in the expansion space between the first discharge line 13 and the second discharge line 11, e.g. by including in the outlet box 4 a distribution plate 15 provided with flow passage openings. The main flow must pass this distribution plate, which has the result that this pressure difference arises. The partial flow does not pass this plate and can be short-circuited via line 13, the upper part of the downcomer 14 and line 16 with the space behind this plate where a lower pressure prevails. Depending on the dimensioning of this plate, a greater or smaller pressure difference arises. A great pressure difference gives a large partial flow. This can be reduced again by providing a regulating valve 17 in line 16.

This small partial flow transports all circulating fluidized bed particles from the outlet box 4 to the upper part of the downcomer 14. To prevent fluidized bed particles from being entrained with the partial flow directed upwards in the downcomer, indicated by arrow Q, this upper part of the downcomer is provided with such a diameter that the upwardly directed velocity of flowing medium in this part of the downcomer is substantially lower than the fall velocity of one single fluidized bed particle in the flowing medium.

Of course, other means may also be included in the top box 4 to generate a flow resistance, e.g. the height h of the level of the fluidized bed in the outlet box above opening 12, a line resistance, a hole plate, a grid, a screen plate, an orifice and/or an entrance loss through a line. A proper choice of the dimension of the fluidized bed particles, the density of the material of the fluidized bed particles, the partial flow of flowing medium and the cross-section of the upper part of the downcomer 14 renders it possible that in the upper part of the downcomer 14 particles other than fluidized bed particles, the so-called 'fluidized bed-foreign' particles, are separated from the fluidized bed particles and discharged with the upwardly directed partial flow. This 'fluidized bed-foreign' particles are e.g. particles already present in the flow of flowing medium fed to the heat exchanger or formed in the heat exchanger, such as e.g. cyrstals. Thus, crystals with the fluidized bed particles flowing downward in the downcomer can be prevented from being fed again to the inlet box.

Sometimes, deposits may be formed on the walls of the outlet box 4, which are not subject to the scouring and cleaning effect of the fluidized bed particles present in the outlet box. These deposits can gradually grow and decompose, and the decomposed pieces can then assume such dimensions that they cannot be discharged from the outlet box 4 with the main flow of flowing medium. As a result of the fluidization of the fluidized bed particles in the outlet box 4 and the attendant grinding effect, the decomposed deposits, in fact also 'fluidized bed-foreign' particles, will be slightly reduced, but, simultaneously, these particles move with the particles of the circulating fluidized bed to the opening 12 of line 13, which connects the outlet box 4 with the upper part of the downcomer 14. To prevent too large parts of the decomposed deposits from entering the downcomer 14, the opening 12 may be provided with a screen, e.g. a screen plate 12A, in which openings are provided, which can pass the fluidized bed particles and those pieces of deposit material meanwhile sufficiently reduced by the grinding effect of the fluidized bed particles. If this is not the case, these pieces of deposit material are kept longer in the fluidized bed in the outlet box, as a result of which these pieces can be reduced further until these parts, too, can pass through the openings of the screen plated or cage-shaped screen 12A. If the ground pieces of deposit material fed via line 13 to the upper part of the downcomer 14 are still too large to be discharged with the partial flow of flowing medium, these parts will be entrained with the fluidized bed particles flowing downward in the downcomer, fed to the inlet box and then, via the tubes, the outlet box and line 13, enter the upper part of the downcomer again. During this transport of the particles from deposit material, in continuous contact with the fluidized bed particles, a further reduction will take place by grinding or pulverization. Finally, the particles of deposit material will have been reduced so far that they can be discharge from the upper part of the downcomer with the partial flow of flowing medium.

Moreover, in the inlet box 3 above the connection of line 27, through which the fluidized bed particles and particles of deposit material can be fed to the inlet box, a screen plate 5A may be provided. This extends the residence time of the particles consisting of deposit material in the grinding and pulverizing fluidized bed in the inlet box, which results in a further reduction of these particles. The above-described method for reducing the pieces of deposit material formed in the outlet box for the purpose of finally being able to discharge this material with the partial flow of flowing medium is also applicable to deposit material entering the heat exchanger but formed elsewhere, e.g. in the inlet box or in the lines upstream of the heat exchanger. It may be clear that such screens 12A, 5A may be designed in many ways and may be used in top boxes or bottom boxes of other types of heat exchangers, e.g. as generally described in PCT/NL94/00081.

Furthermore, in line 16 may be included a separator 18, with which 'fluidized bed-foreign' particles above a specific dimension can be removed from the partial flow via line 19. Discharge of these particles may take place continuously or batchwise. Such a separator can be realized with relatively limited dimensions, because the partial flow is small with respect to the main flow. In general, the partial flow will be discharged to that part of the outlet box 4 where a lower pressure prevails. That is, in the present case, downstream of the distribution plate 15, or in case that no distribution plate 15 is used to line 11 where, too, a pressure lower than in the outlet box prevails as a result of the height h of the level of the fluidized bed in the outlet box above the opening 12, the entrance loss and line resistance. The advantage of the above-described situation is that the partial flow is coupled to the main flow. When the main flow increases, the pressure difference also increases, and hence the partial flow, too. Of course, pressure difference and partial flow will decrease when the main flow decreases.

In some cases, the partial flow of flowing medium is not to be fed back to the main flow of flowing medium, but to be discharged to another part of the process with a pressure much lower than in the outlet box. This requires a good regulation for the partial flow, since otherwise there is a risk that too large a partial flow will be withdrawn from the heat exchanger, which involves a risk that with the partial flow fluidized bed particles will be discharged from the heat exchanger, too. It has been observed before that the pressure difference required for realizing the partial flow from the outlet box 4 via line 13, the upper part of the downcomer 14 and line 16 may be about 0.05 to 0.1 bar. By properly designing the upper part of the downcomer 14, this pressure difference can be reduced. Optionally, the desired partial flow may be realized without making use of the distribution plate 15 or of the entrance pressure loss in opening 10, whether or not in combination with the pressure loss in a part of line 11.

Figure 2:
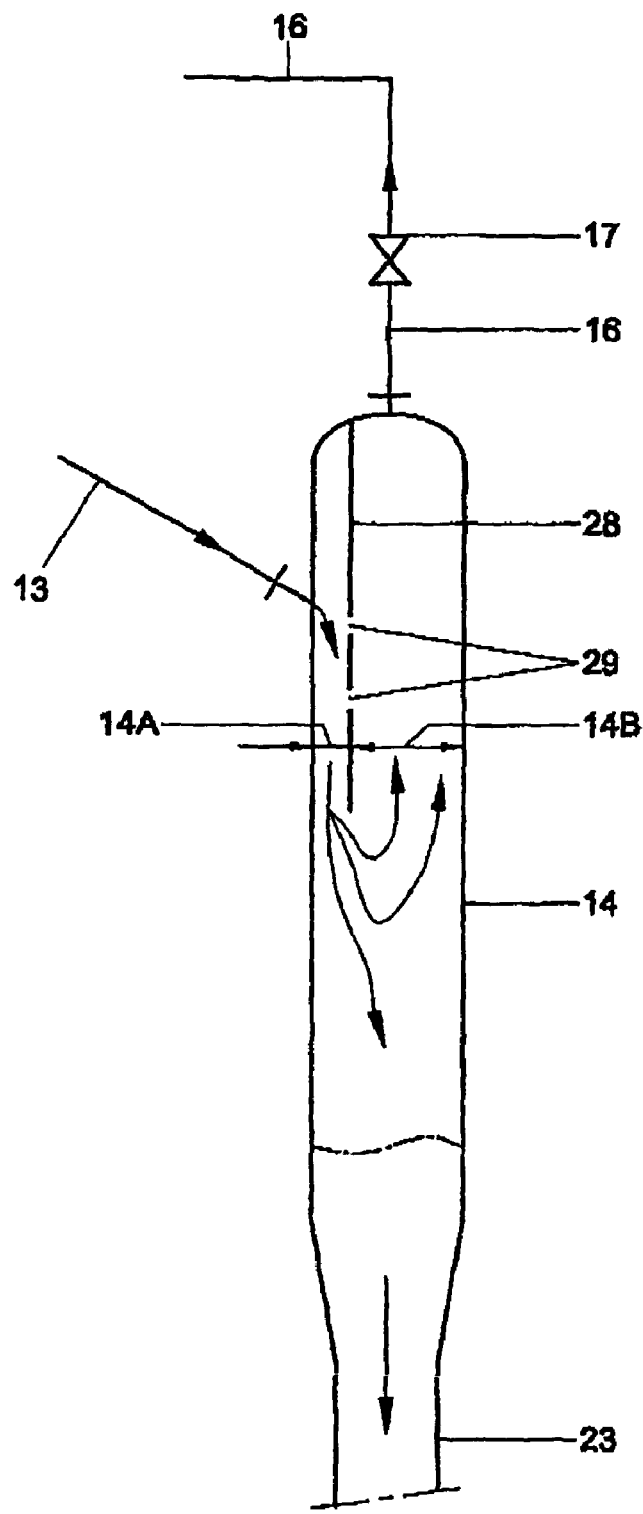
FIG. 2 is a detail of a top end of the downcomer of the heat exchanger of FIG. 1, in which a separation wall is provided.

FIG. 2 therefore shows an embodiment of the upper part of the downcomer 14, by which the above pressure loss can be limited or avoided.

For this purpose, the upper part of the downcomer 14 is divided into two channels. A first channel 14A, connected to line 13 and closed at the top end and open at the bottom end, processes the downward partial flow of flowing medium coming from the outlet box 4 with the circulating fluidized bed particles and 'fluidized bed-foreign' particles present therein. A second channel 14B, the cross-section of which is determined by the cross-section of the upper part of the downcomer 14, reduced by the cross-section of channel 14A, processes the upward partial flow of flowing medium with 'fluidized bed-foreign' particles optionally present therein. The upwardly directed velocity of the partial flow of flowing medium in channel 14B must be lower than the fall velocity of one single fluidized bed particle in the flowing medium. By designing channel 14A with a smaller cross-section than channel 14B, a high concentration of fluidized bed particles is formed in channel 14A. This contributes to a natural circulation of the flowing medium from the outlet box 4, via line 13, channel 14A, channel 14B and finally via line 16 to the point of connection of line 16 to the outlet box 4 or line 11. The greater the length of channel 14A is selected, the more the driving force for the natural circulation of the partial flow of flowing medium increases. At a sufficient length of channel 14A and a sufficiently high concentration of fluidized bed particles in channel 14A, it can be decided not to use a pressure difference over a distribution plate or a pressure difference owing to an entrance loss, or possibly in combination with a pressure difference as a result of a line resistance. It is observed that such a downcomer provided with two channels can, also in itself, be advantageously used in other heat exchangers, e.g. of the type described in PCT/NL94/00081.

As shown in the exemplary embodiment, the channels 14A, 14B can be formed by a separation plate 28 extending downwardly in the upper part of the downcomer 14. The channels may also be formed in other ways, for instance by providing in the upper part of the downcomer a downwardly extending tube, with which the fluidized bed particles are fed to the downcomer. Preferably, such a tube is formed as extension of the second discharge line 13.

If the partial flow of flowing medium is to be operated completely on natural circulation, the line 13 may be arranged at a downward angle to set the natural circulation in self-starting motion.

Figure 3:
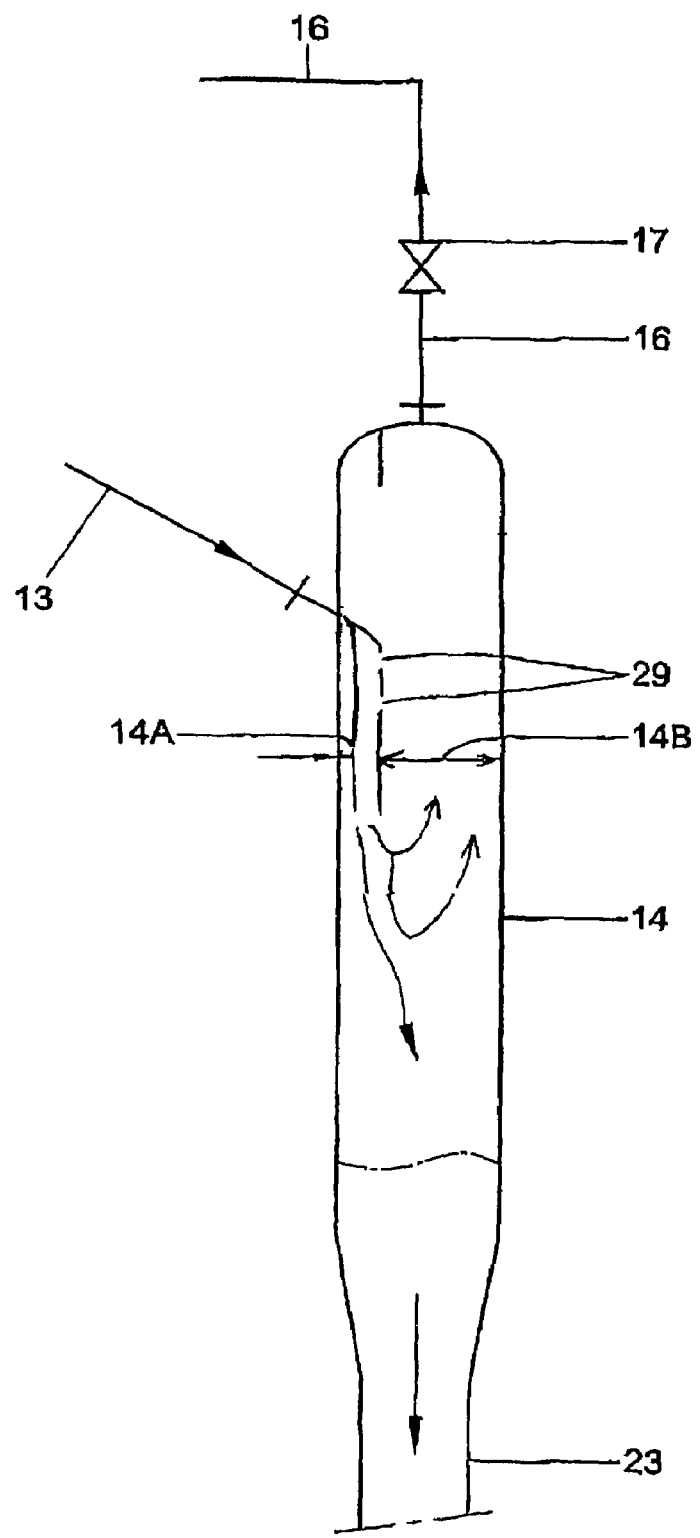
FIG. 3 is a detail of the top end of a second embodiment of the heat exchanger of FIG. 1, in which a tube is provided with openings.

The upper part of the downcomer 14 should preferably be able not only to accommodate the cross-sections of the channels 14A and 14B, but also to serve as reservoir for the storage of fluidized bed particles. During normal use, the downcomer 14 is preferably filled about half with a packed bed of fluidized bed particles. In this example, during normal use, this packed bed of circulating fluidized bed particles preferably has a rate of about 10 to 15 cm/s in the lower part of the downcomer 23. The amount of circulating fluidized bed particles and the rate of the bed of particles in the downcomer determine the cross-section of the lower part of the downcomer 23. If the flow of flowing medium through line 21B is closed, the transport of fluidized bed particles from the downcomer to the inlet box will stop, too. The flow of flowing medium through line 21A will, however, flush a great part of the fluidized bed particles out of the inlet box 3, tubes 2 and outlet box 4 via line 13 and channel 14A to the upper part of the downcomer. The space below channels 14A is generally not sufficient to accommodate this amount of fluidized bed particles, since the aim is to maximize the length of channel 14A. It may therefore happen that channel 14A, too, is filled up with fluidized bed particles coming from the inlet box, the tubes and the outlet box of the heat exchanger. Preferably, channel 14A is prevented from being filled up until the outlet of line 13 one or more openings 29 may be provided in the separation wall between channel 14A and channel 14B, thus ensuring that fluidized bed particles can overflow from channel 14A into channel 14B and the full cross-section of the upper part of the downcomer can be utilized for storage of fluidized bed particles. As shown in FIG. 3, a tube may extend downward in the downcomer including overflow openings 29 in another embodiment. In the majority of cases, the demands to accommodate channel 14A and channel 14B in one cross-section of the upper part of the downcomer 14 in combination with the demands for storage a specific amount of fluidized bed particles will lead to a cross-section greater than the cross-section of the lower part of the downcomer 23, which is determined by the velocity of the packed bed. This accounts for the stepped configuration of the cross-section of the downcomer 14.

It may be clear that the invention is not limited to the preferred embodiment shown herein.

The invention claimed is:

1. An apparatus for carrying out a physical chemical process on a medium, the apparatus comprising:
   a reservoir,
   a tube disposed in the reservoir and having a first end portion and a second end portion,
   tube plates, wherein the first end portion and second end portion of the tube are received in the tube plates,
   a first box and a second box, wherein the first end portion of the tube is in open communication with the first box and the second end portion of the tube is in open communication with the second box,
   a first distribution plate disposed in the second box, wherein the first distribution plate supports a first fluidized bed of granular material, wherein said first fluidized bed of granular material is maintainable in a quasi-stationary, fluidized condition by the medium, wherein the medium flows through the second box and the tube and entrained granular material is separated from the medium in the first box by gravity,
   a downcomer disposed outside the reservoir,
   a first discharge line provided in the first box, discharging the separated granular material and a partial flow of the medium to the downcomer, wherein the separated granular material is further separated from the partial flow of the medium in the downcomer by gravity,
   a second discharge line provided in the first box, discharging a main flow of the medium, wherein the granular material has been separated from the main flow of the medium, and a third discharge line provided near a first end in the downcomer, feeding the granular free partial flow of the medium to the main flow of the medium, and wherein said downcomer feeds the granular material separated from the partial flow medium to the second box;

wherein the downcomer is provided near the first end with a first channel for downward transport of the granular material fed to the downcomer and a second channel for upward transport of the partial flow of the-medium without granular material, and wherein the downcomer is provided with a downwardly extending separation plate, forming the first channel and the second channel of the downcomer.

2. The apparatus of claim 1, wherein the first box comprises integrated flow velocity reducing means, reducing an upward flow velocity of the medium.

3. The apparatus of claim 2, wherein the flow velocity reducing means comprise an expansion space.

4. The apparatus of claim 3, wherein a part of the first box defines the expansion space and has an enlarged diameter with respect to the reservoir.

5. The apparatus of claim 2, wherein the flow velocity means comprise a flow resistance.

6. The apparatus of claim 5, wherein the flow resistance is at least partly formed by a second fluidized bed of granular material, wherein the second fluidized bed of granular material is formed in the first box.

7. The apparatus of claim 6, wherein the first discharge line connects to the second fluidized bed, and wherein the second discharge line is located in an upward flow direction at a distance above the second fluidized bed.

8. The apparatus of claim 5, wherein the flow resistance comprises a second distribution plate, extending in the expansion space between the first and the second discharge lines, and defining flow passage openings.

9. The apparatus of claim 1, wherein an opening of the first discharge line is provided with a screen.

10. The apparatus of claim 1, wherein the second box is provided with a screen.

11. The apparatus of claim 1, wherein the apparatus is a heat exchanger.

* * * * *